United States Patent
Lee et al.

(10) Patent No.: US 6,778,156 B2
(45) Date of Patent: Aug. 17, 2004

(54) METHOD FOR EXAMINING QUALITY OF FLAT PANEL DISPLAY DEVICE

(75) Inventors: Gun Hee Lee, Kyongsangbuk-do (KR); Wi Jin Nam, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 445 days.

(21) Appl. No.: 09/859,577

(22) Filed: May 18, 2001

(65) Prior Publication Data

US 2002/0000983 A1 Jan. 3, 2002

(30) Foreign Application Priority Data

May 19, 2000 (KR) ........................................ 2000-27091

(51) Int. Cl.[7] ................................................ G09G 3/36
(52) U.S. Cl. .............................. 345/87; 702/35; 702/36; 702/84; 324/770
(58) Field of Search ................................ 324/158, 770; 345/87–92; 702/84, 35, 36

(56) References Cited

U.S. PATENT DOCUMENTS

| | | | |
|---|---|---|---|
| 5,285,150 A | * | 2/1994 | Henley et al. .............. 324/770 |
| 5,764,209 A | * | 6/1998 | Hawthorne et al. ............ 345/87 |
| 5,994,916 A | * | 11/1999 | Hayashi ...................... 324/770 |
| 6,191,770 B1 | * | 2/2001 | Kim ............................ 345/100 |
| 6,466,882 B1 | * | 10/2002 | Kang et al. ................... 702/84 |
| 6,529,837 B1 | * | 3/2003 | Kang .......................... 702/36 |
| 6,552,563 B1 | * | 4/2003 | Yaniv et al. ................ 324/770 |

\* cited by examiner

*Primary Examiner*—Steven Saras
*Assistant Examiner*—Srilakshmi K. Kumar
(74) *Attorney, Agent, or Firm*—Morgan, Lewis & Bockius LLP

(57) ABSTRACT

A method for examining quality of a flat panel display device is disclosed, in which good/fail of the flat panel display device is automatically examined to improve efficiency of the operation and obtain exact examined result. The method for examining good/fail of a flat panel display device includes the steps of inputting defect data for each process step, automatically examining good/fail of the panel depending on the input defect data, and measuring good/fail and yield of a glass based on the examined result of the panel.

26 Claims, 10 Drawing Sheets

FIG.2D

| lot No: ABCD001-00 | | | Glass ID: A | | | |
|---|---|---|---|---|---|---|
| field 1 | field 2 | field 3 | field 4 | field 5 | field 6 | field 7 |
| 3 | 8 | 6 | 7 | | | |
| | | | | | | |
| field 8 | field 9 | field10 | field11 | field12 | field13 | field14 | field 4

1. boring
2. plucking
3. upper erosion
4. lower erosion
5. permeation of solution
6. sawtooth
7. congregation
8. residue
9. linear shape
10. round shape
11. foreign material type
12. floating
13. misalignment
14. ETC
15. skip passive examination mode

| lot No: ABCD001-00 | | | Glass ID: A | | | |
|---|---|---|---|---|---|---|
| field 1 | field 2 | field 3 | field 4 | field 5 | field 6 | field 7 |
| 3 | 8 | 6 | 7 | 2 | 1 | |
| | | | | | | |
| field 8 | field 9 | field10 | field11 | field12 | field13 | field14 | field 6

1. RP
2. RW
3. NG
4. RP distance X
5. RW distance X
6. NG distance X
7. ETC
8. skip passive examination mode

FIG.2G

| lot No: ABCD001-00 | | | Glass ID: A | | | |
|---|---|---|---|---|---|---|
| field 1 | field 2 | field 3 | field 4 | field 5 | field 6 | field 7 |
| 3 | 8 | 6 | 7 | 2 | 1 | 3 |
|  |  |  |  |  |  |  |
| field 8 | field 9 | field10 | field11 | field12 | field13 | field14 | field 7

1. 0P
2. 1P
3. 2P
4. 3P
5. GP
6. LO
7. LS
8. SPOT
9. ETC
10. SKIP passive examination mode

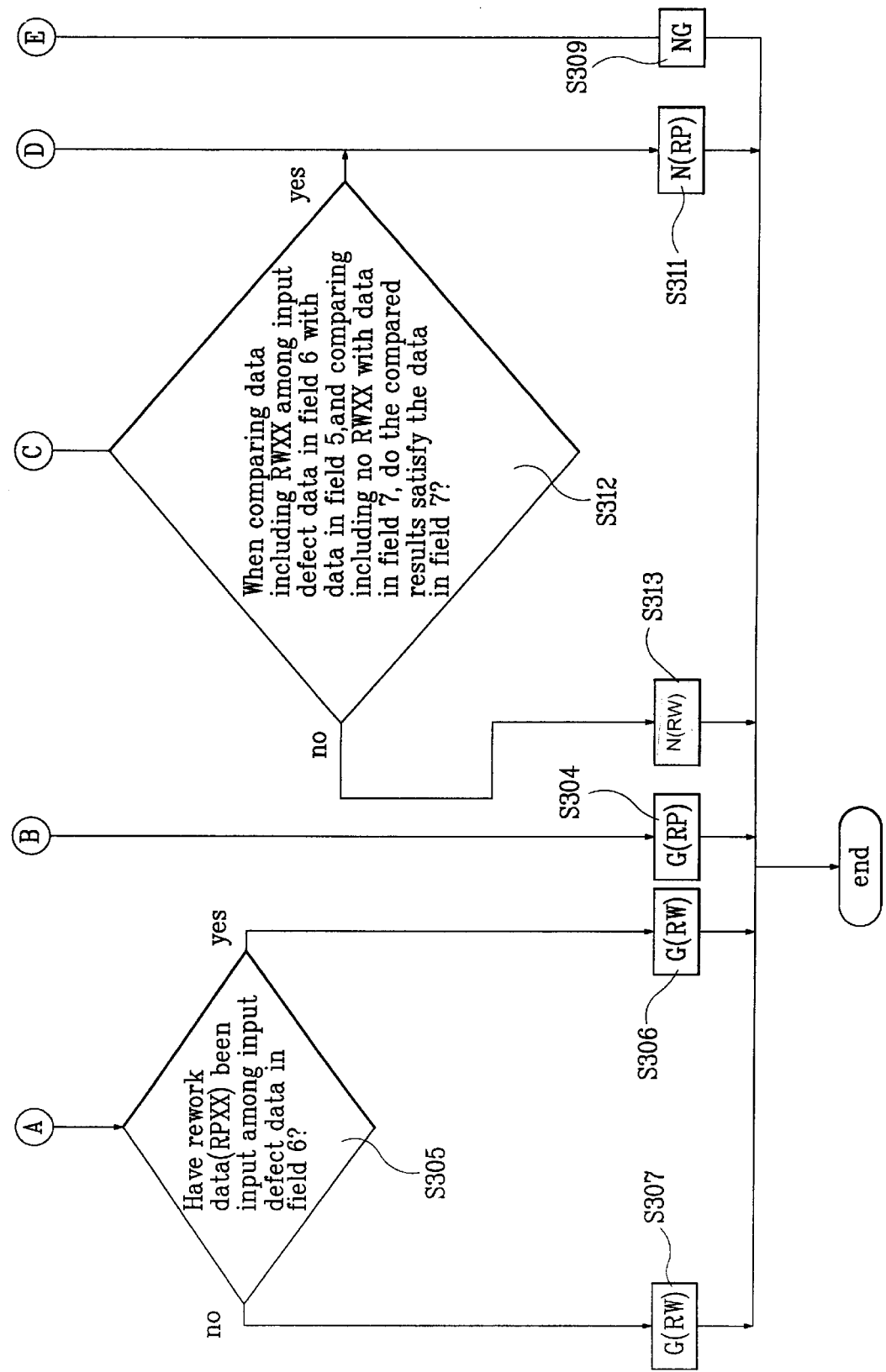

METHOD FOR EXAMINING QUALITY OF FLAT PANEL DISPLAY DEVICE

BACKGROUND OF THE INVENTION

1. Field of the Invention.

The present invention relates to a method for examining quality of a display device, and more particularly, to a method for examining quality (good/fail) of a liquid crystal display (LCD) device.

2. Discussion of the Related Art

A Cathode Ray Tube (CRT) which is one of display devices is mainly used in monitors of information terminals and measuring instruments including TV. However, it was difficult for the CRT to actively adapt to miniaturization and light weight of electronic products due to its weight and size.

To substitute for such a CRT, an LCD device having a small size and light weight has been actively developed. Recently, the LCD device can act as a flat panel display device. Thus, demand of the LCD device is on an increasing trend.

Development and application of TFT-LCD industries have been accelerated in accordance with increase of the dimensions and increase of the resolution. To increase the productivity and ensure the low cost, many efforts have been continued in view of simplified process steps and improvement of yield.

It is important to examine good/fail and rework of a panel and a glass substrate in view of improvement of yield. Accordingly, whether to quickly and easily examine good/fail of the panel and the glass substrate significantly acts on efficiency of the operation.

A related art method for examining quality (good/fail) of a flat panel display device will be described with reference to the accompanying drawings.

FIG. 1 is a flow chart showing a related art method for examining quality of a flat panel display device.

After examining good/fail of an individual defect, an operator determines quality of a panel based on the examined result of the individual defect.

The individual defect means the defect degree of a pixel within a panel and is also called a pixel defect. If a specification of the pixel defect is as below Table 1 and 1P=4, 2P=2, and 3P=1 within the panel, the specification of 1P, 2P, and 3P is satisfactory but the number of total pixel defects is 4+(2+2)+(1+1+1)=11. In this case, it can be determined as a defect and the operator should directly calculate the number of defects.

TABLE 1

| Defect | Good |
| --- | --- |
| 1 connection pixel defect (1P) | ≦4 |
| 2 connection pixel defect (2P) | ≦2 |
| 3 connection pixel defect (3P) | ≦1 |
| The number of total pixel defects | ≦10 |

As described above, after examining the individual defect, the operator should directly examine good/fail of a unit panel and further good/fail of the whole glass substrate, based upon the examined result.

In other words, some of defect data is recorded in a test sheet or a tester, and the operator determines and records the required examined result.

As described above, the operator directly examines the individual defect and examines a defect of the panel based on the examined result of the individual defect. Then, the operator examines good/fail of the whole glass substrate based on the examined result of the panel defect.

However, the related art method for examining quality of a flat panel display device has several problems.

Since the operator records contents of the defect and the examined result at the same time, efficiency of the operation may be deteriorated, the examined result may occur in error, and the record of the defect may be false. That is to say, the operator should examine good/fail of the panel considering each unit defect such as individual defect, panel defect, and glass defect. In this case, since calculation is complicate and logic is difficult, it takes time to examine good/fail of the panel. Also, good/fail of the panel may be examined in error.

SUMMARY OF THE INVENTION

Accordingly, the present invention is directed to a method for examining quality of a flat panel display device that substantially obviates one or more of the problems due to limitations and disadvantages of the related art.

An object of the present invention is to provide a method for examining quality of a flat panel display device in which good/fail of the flat panel display device is automatically examined to improve efficiency of the operation and obtain exact examined result.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a method for examining good/fail of a flat panel display device according to the present invention includes the steps of inputting defect data for each process step, automatically examining good/fail of the panel depending on the input defect data, and measuring good/fail and yield of a glass based on the examined result of the panel.

The step of inputting the defect data includes the steps of inputting position data of a defect, inputting type data depending on the position data, inputting cause process data depending on the type data of the defect, inputting data on the degree of the defect for automatic examination, inputting rework data for relieving the degree of the defect, inputting estimated result data in case of rework, inputting result data after rework, and inputting the cause if the estimated result data is different from the result data after rework.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein:

FIGS. 2a to 2g are window screens illustrating a method for examining quality (good/fail) of a flat panel display device according to the present invention; and FIGS. 3A to 3B are a flow chart illustrating a method for automatically examining quality (good/fail) of a flat panel display device according to the present invention.

DETAILED DESCRIPTION OF THE PREFERRED EMBODIMENTS

Reference will now be made in detail to the preferred embodiments of the present invention, examples of which are illustrated in the accompanying drawings.

In the present invention, it is intended that a portion which examines good/fail of a panel based on subdivided defect data and outputs the examined result is automated by a tester or peripheral equipments through a program, thereby enhancing efficiency of the operation and enabling exact examination.

For automatic examination, a classified system of a defect is subdivided into at least three stages, and a number of examining factors are provided within each classified system to allow an operator to easily input data for examining good/fail of a panel.

A method for examining good/fail of a flat panel display device according to the present invention will now be described in more detail.

The method for examining good/fail of a flat panel display device according to the present invention includes the steps of subdividing a defect so as to input defect data, and examining good/fail of the panel referring to the input defect data and further automatically examining good/fail of a glass.

To input the defect data and automatically examine the defect data, seven fields are used in the embodiment of the present invention The number of the fields may optionally be added, changed, and modified.

The seven fields have data as shown in Table 2 below.

| Field | Field 1 | Field 2 | Field 3 | Field 4 | Field 5 | Field 6 | Field 7 |
| --- | --- | --- | --- | --- | --- | --- | --- |
| Data | Position of defect | Types of defect | Cause process | Detailed types | Degree of defect | Data for relieving defect | Estimated result of repair |

The fields 1 to 4 correspond to steps of inputting defect data for each process step, and the fields 5 to 7 automatically estimate and examine the defect. In the embodiment of the present invention, while three fields (the fields 5 to 7) have been used to automatically examine the defect data, more fields maybe assigned to automatically examine the defect data as the case may be. That is, after forming total 14 fields or more, three or more fields are assigned to automatically examine the defect data. This could lead to more exact examination of the defect data.

First, input of the defect data and its automatic examination are performed for each unit of glass (hereinafter, "LOT") to which a serial number is assigned. Since a plurality of panels are defined in one glass, it is possible to examine good/fail of a corresponding glass and measure yield by examining good/fail of each panel.

Input of the defect data and its automatic examination for each field depending on the method for examining good/fail of a flat panel display device according to the present invention will be described.

Field 1

Figure 1:
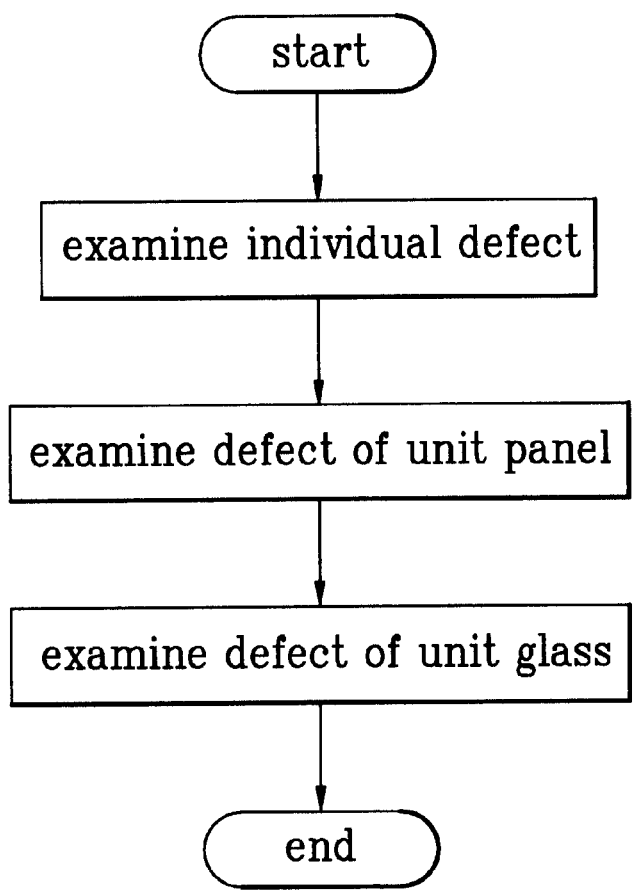
FIG. 1 is a flow chart illustrating a related art method for examining quality of a flat panel display device.
Figure 2A:
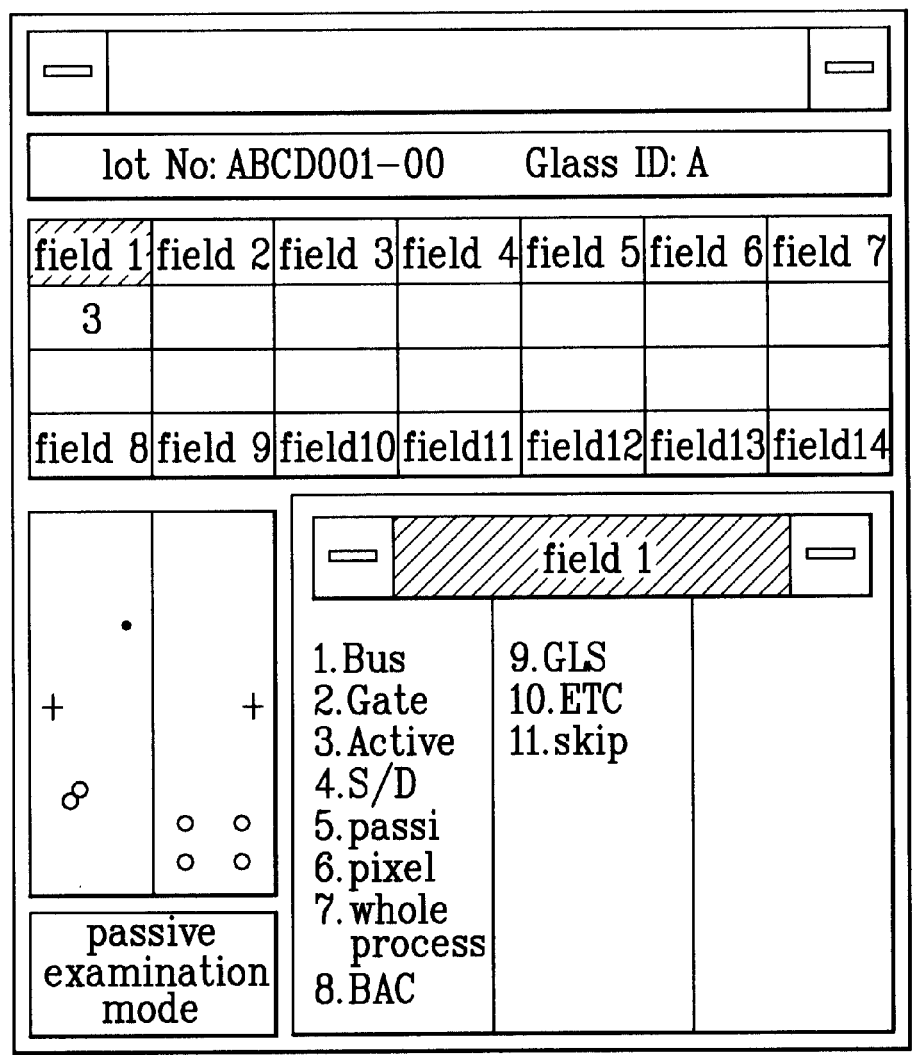

As shown in FIG. 2a, if an operator selects field 1, position data that enables to generate a defect for each process step are displayed on a window screen. The position data are subdivided into detailed data such as bus, gate, active, source/drain, passivation, pixel, . . . , ETC., and skip. A unique index is assigned to each detailed data so that the operator can easily input the position data with the index only.

The skip data is to move to a next field without inputting the defect data when the input data is displayed as defect data in error. The ETC. is used in case of either an inevitable defect in the flat panel display device or a fine defect.

The operator inputs an index of a corresponding data among the detailed data depending on the position data through a key board (or mouse) referring to a readable photograph. As an example, if the position of the defect appeared in the readable photograph is active, the operator selects index "3."

The detailed data appeared in the screen may optionally be changed, modified, and added.

As described above, if the position of the defect is selected, the window screen automatically moves to the field 2.

Field 2

Figure 2B:
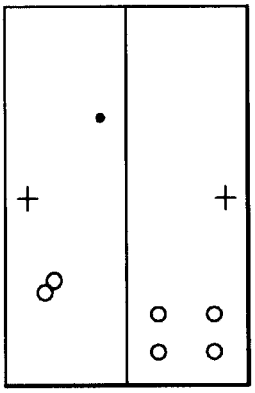

FIG. 2b shows a window screen after data input of Field 1 is completed. Referring to FIG. 2b, types of the defect for each detailed data of the position data are displayed.

Actually, the types of the defect include all of types of the defect that can appear in a TFT substrate, a cell, and a module. In the embodiment of the present invention, several types are exemplarily displayed.

Detailed data depending on types of the defect includes loss, addition, foreign material pattern, particle, layer defect, discoloration, scratch, spot, and static electricity. In the same manner as the field 1, the detailed data includes ETC. data and skip data. Such detailed data may optionally be added, changed, and modified as the case may be.

A unique index is assigned to each detailed data so that the operator can easily input the type data.

An operator selects an index corresponding to types of the defect appeared in a readable photograph among displayed detailed data. As an example, if the defect in a spot type is appeared in the readable photograph, the operator selects an index "8."

As described above, if input of the detailed data depending on types of the defect is completed, the window screen automatically moves to the field 3. The field 3 checks which process causes the cause of the defect.

Field 3

Figure 2C:
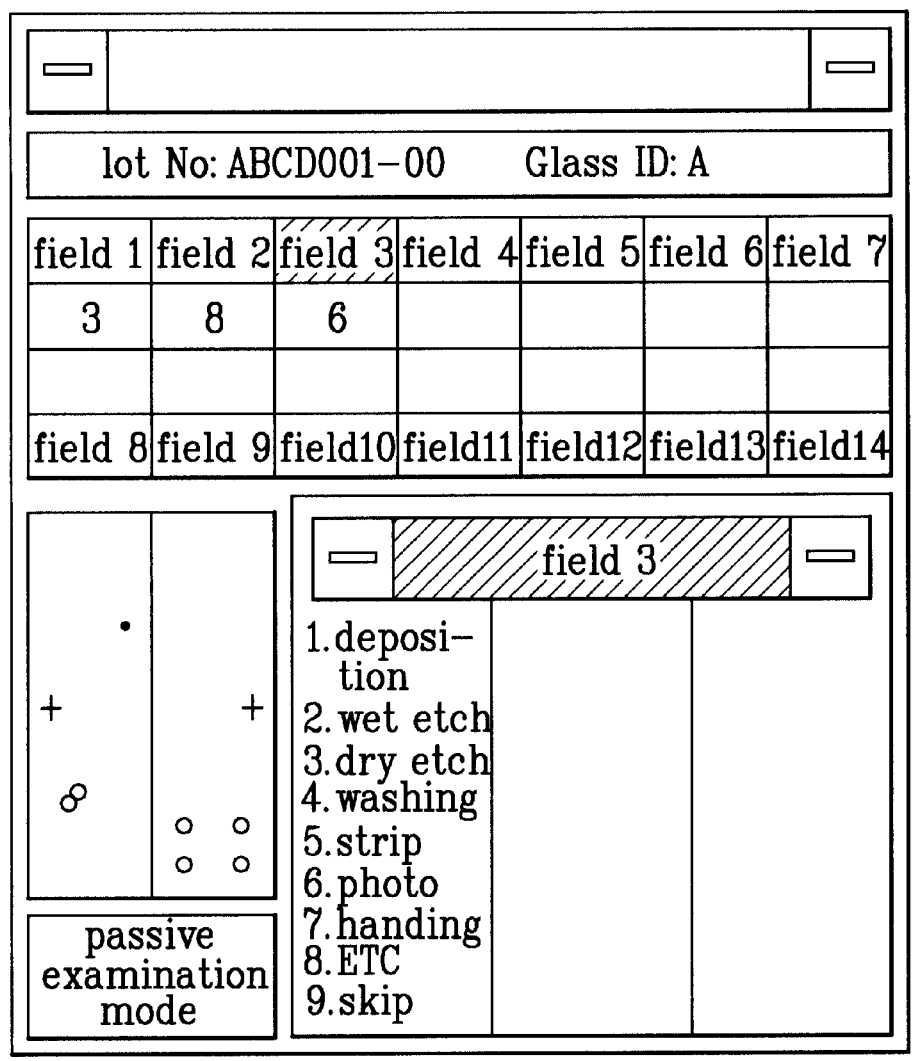

FIG. 2c shows a window screen which displays detailed data depending on a cause process after data on types of the defect is input.

Generally, in a flat panel display device, especially, an LCD device, the cause process of the defect includes detailed data such as deposition, wet etching, dry etching, washing, strip, photo, and handing. In the same manner as the fields 1 and 2, the detailed data includes ETC. data and skip data.

A unique index is assigned to each detailed data so that an operator can easily input the index only corresponding to the detailed data to be input by the operator through a key board or mouse. As an example, if the cause process of the defect is a photo process, the operator selects an index "6."

As described above, if input of each detailed data depending on the position, types, and cause of the defect is completed, the window screen automatically moves to the field 4. A more detailed type that can occur in a corresponding process depending on input of the detailed data of the cause process is displayed on the window screen.

Field 4

FIG. 2*d* shows a window screen which displays a detailed type depending on types of the defect. That is, the detailed data corresponding to the detailed type is directed to a type of a detailed defect for each detailed data of the position data, the type data, and the cause process data. Examples of the detailed data include boring, plucking, upper erosion, lower erosion, permeation of solution, sawtooth, congregation, residue, linear shape, round shape, dotted shape, foreign material type, floating, and misalignment. In addition, there exist more detailed data. In the embodiment of the present invention, some of the detailed data are provided. A unique index is assigned to each detailed data, and the detailed data may be added, changed, and modified as the case may be.

The operator selects and inputs an index corresponding to a corresponding type among the detailed data depending on the detailed types. For example, if the detailed type of the defect is a congregated type, the operator inputs an index "7." Thus, input of an individual defect data for examining good/fail is completed.

The defect 15 automatically examined after the next field 5.

Field 5

Figure 2E:
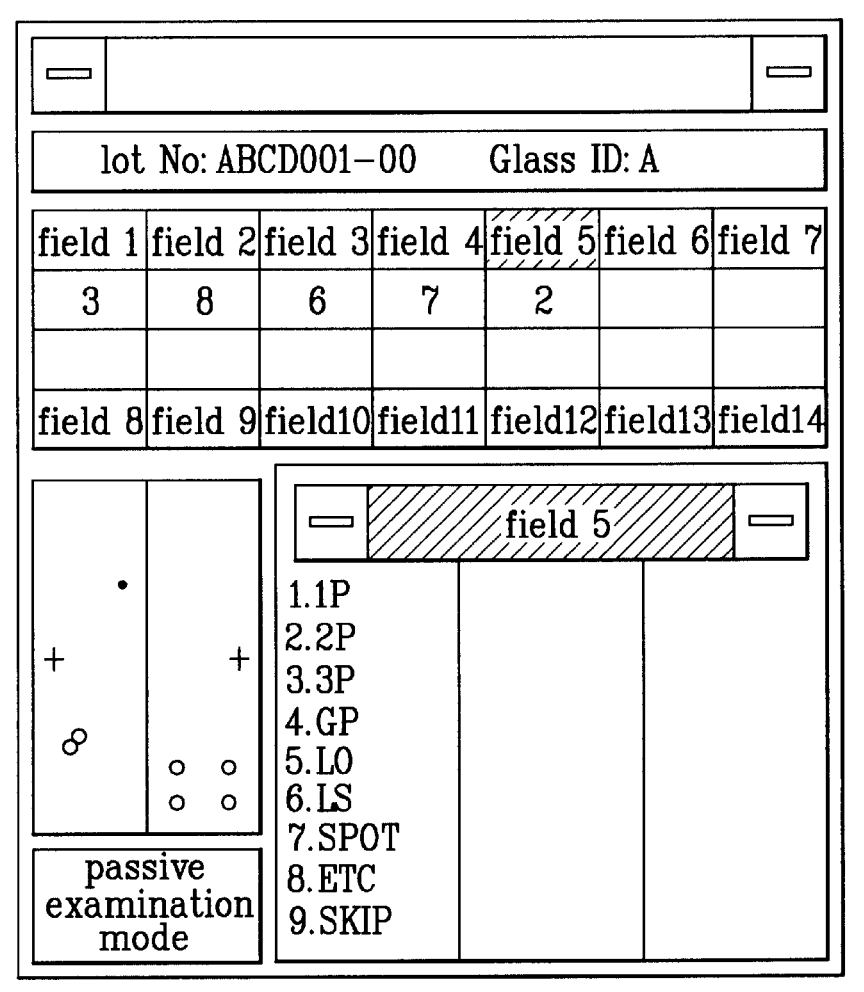

FIG. 2*e* shows a window screen which displays the degree of the defect for automatic examination if input of the individual defect data is completed.

The detailed data depending on the degree of the defect includes data on the number of unit pixels where a point defect occurs, data on a line defect such as line open (LO) and line short (LS), and data on spot, ETC., and skip. These detailed data are displayed on the screen in formats of 1P, 2P, 3P, GP, LO, LS, spot, ETC., and skip. Here, 1P, 2P, and 3P respectively mean one pixel, two connection pixels, and three connection pixels. Also, GP means connection pixels more than three connection pixels 3P.

A unique index is assigned to each detailed data. As an example, if the number of unit pixels, where a point defect occurs in a readable photograph, is 2, an operator selects and inputs an index "2" corresponding to 2P.

As described above, if input of the detailed data on the degree of the defect is completed, the window screen automatically moves to the field 6.

Field 6

The field 6 is to input repair data (RPXX) and rework data (RWXX) for relieving the defect. As shown in a window screen of FIG. 2*f*, the detailed data includes data on the defect that requires repair(RP), data on the defect that requires rework(RW), data on the defect (NG) that requires neither repair nor rework, data on the distance (RP distance X) between pixels where a point defect that requires repair occurs, data on the distance (RW distance X) between pixels where a point defect that requires rework occurs, and data on the distance (NG distance X) between pixels where a point defect that requires neither repair nor rework occurs. The detailed data are displayed on the screen in formats of RP, R, NG, RP distance X, RW distance X, NG distance X, ETC., and skip. An index is assigned to each detailed data. An operator selects and inputs one of the indexes. For example, it is determined that the current defect requires repair, the operator inputs an index "1."

Generally, if two or more point defects exist, the distance examination is performed. If the number of the distance examination is greater than a reference value, It is determined as a defect (NG).

As described above, if input of the repair and rework data for relieving the defect is completed, the window screen automatically moves to the field 7.

Field 7

The field 7 is to input data of estimated results when repair has been performed. As shown in FIG. 2*g*, the estimated results are displayed on the screen in formats of 0P, 1P, 2P, 3P, GP, LO, LS, spot, ETC., and skip. The estimated results displayed on the screen have been obtained by estimating in advance the probability of the defect when repair has been performed. As an example, 2P means that two pixels may be defected when repair has been performed. In this case, the operator inputs an index "3."

As described above, by inputting all the data from the field 1 to the field 7, good/fail of each panel defined in a glass is automatically examined. Further, good/fail of the glass can be examined based on the examined result of good/fail of the panel. That is, by repeating the steps from the field 1 to the field 7, the examined result of good/fail of each panel can be obtained. Based on the examined result of good/fail of the panel, good/fail of the glass can be examined and the whole yield can be checked.

Automatic examination according to the present invention is performed in the order of input of the defect data, examination of good/fail of the panel, and examination of good/fail of the glass.

A method for automatically examining quality (good/fail) of a flat panel display device according to the present invention will be described with reference to FIG. 3.

Figure 3A:
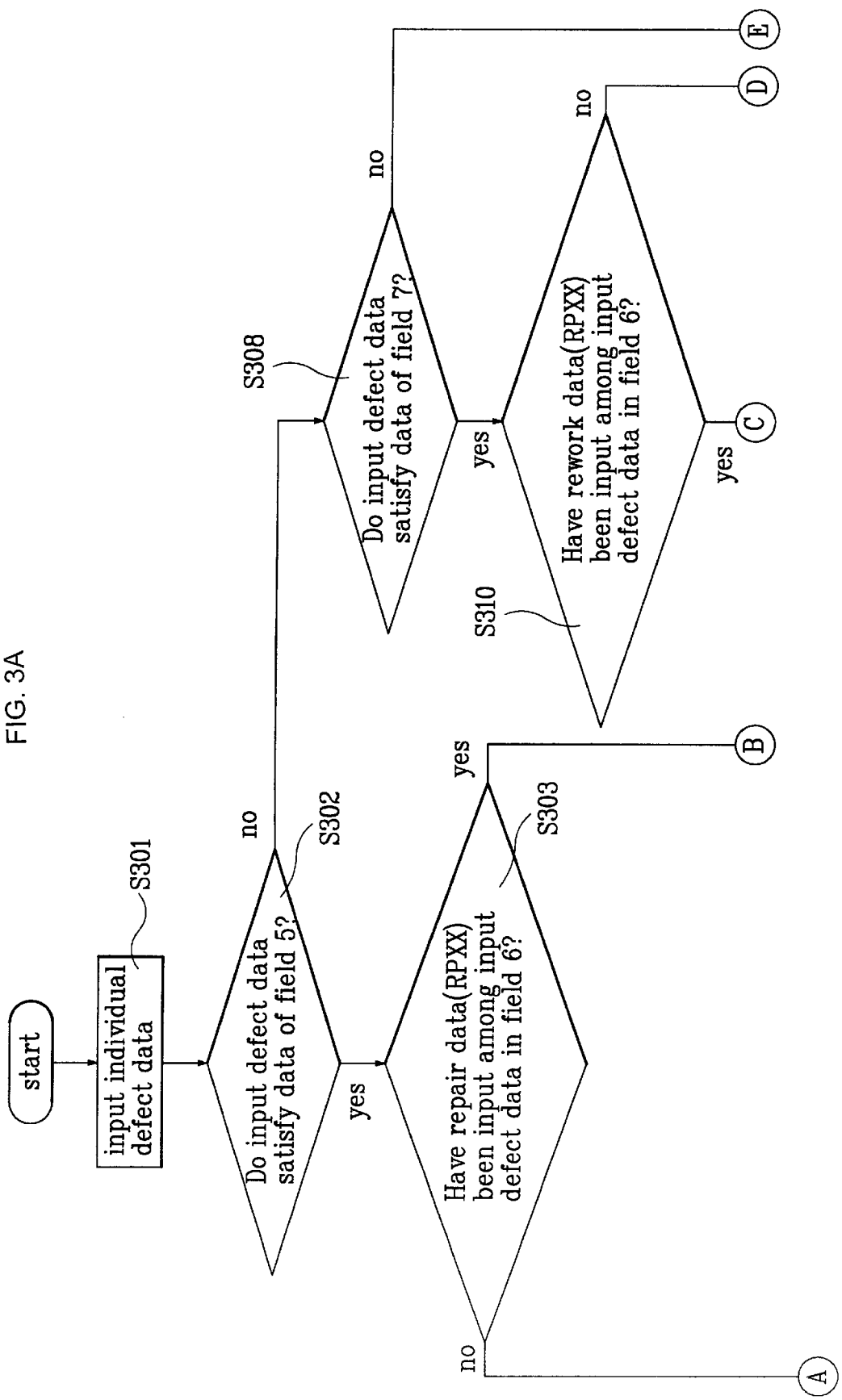

As shown in FIG. 3, individual defect data from the field 1 to the field 4 are input in step S301. It is then determined whether the individual defect data input until the field 4 satisfy the data on the degree of the defect in the field 5, in step S302. If not so, it is examined whether the current panel has a defect (N(RP)) that requires repair, a defect (N(RW)) that requires rework, or a defect (NG) that requires neither repair nor rework. If so, it is examined whether the current panel has good quality (G(RP)) that requires repair, good quality (G(RW)) that requires rework, or good quality (G) that requires neither repair nor rework.

Whether the defect is first examined or the good quality is first examined is determined depending on a priority order. In the embodiment of the present invention, the priority order is given to examination of the good quality. The steps of examining the good quality will be performed below.

In other words, when inputting the repair data (RPXX) for relieving the defect in the field 6, it is detected whether an index corresponding to the defect data that requires repair and the data on the distance between defect pixels that require repair has been input, in step S303.

As a result of the step S303, if the index corresponding to the repair data (RPXX) has been input, it is finally examined that the current panel has good quality (G(RP)) having the defect that requires repair, in step S304. If the index corresponding to the repair data (RPXX) has not been input, it is finally examined whether the current panel has good quality that requires rework. That is, when inputting she rework data (RWXX) in the field 6, it is detected whether an index corresponding to the defect data that requires rework and the data on the distance between defect pixels that require rework has been input, in step S305.

As a result of the step S305, if the index corresponding to the rework data (RWXX) has been input, it is finally examined that the current panel has good quality (G(RW)) having the defect that requires rework, in step S306. If the index corresponding to the rework data (RWXX) has not been input, it is finally examined that the current panel has good quality (G) that does not require rework, in step S307.

Consequently, it is noted that the good quality is examined by determining whether the input individual defect data require repair, rework, or neither repair nor rework.

If the individual defect data input until the field 4 do not satisfy the data on the degree of the defect in the field 5, the steps of examining the defect will be performed as follows.

The defect is examined by determining whether the current panel has a defect (N(RP)) that requires repair, a defect (N(RW)) that requires rework, or a defect that requires neither repair nor rework. To this end, it is determined whether the individual defect data input until the field 4 satisfy the estimated result data of repair, in step S306. As a result, if not so, it is finally examined whether the current panel has a defect (NG) that requires neither repair nor rework, in step S309. If so, when inputting the data on the degree of the defect input in the field 6, it is detected whether an index corresponding to the defect data that requires rework and the data on the distance between defect pixels that require rework has been input, in step S310.

As a result of the step S310, if the index corresponding to the rework data (RWXX) has not been input, it is finally examined that the current panel has a defect (N(RP)) that requires repair, in step S311. If the index corresponding to the rework data has been input, the following steps will be performed.

That is, the defects including the rework data (RWXX) are compared with the data of the field 5 while the defects including no the rework data (RWXX) are compared with the data of the field 7 so that it is examined whether the defects satisfy the data of the field 7, in step S312.

As a result of the step S312, if the defects satisfy the data of the field 7, it is finally examined that the current panel has a defect (N(RP)) that requires repair, in step S311. If not so, it is finally examined that the current panel has a defect (N(RW)) that requires rework, in step S313.

By the above steps, good/fail of the panel is examined, and good/fail of the glass can be examined based on the examined result of good/fail of the panel.

Meanwhile, a panel number in which automatic examination is currently performed, the number of defects, and the result of examining good/fail of a previous panel are displayed on the window screen so as to assist the operator to input the data.

In the present invention, in addition to automatic examination, a compulsory examination (passive examination) function can be performed. This compulsory examination function is to forcibly input the defect data if a new defect which is not included in the detailed data is found.

For compulsory examination, it is necessary to add a newly found defect to the detailed data and to input panel and glass numbers in which examination is currently performed. If the operator changes an examination mode of the panel from automatic examination to compulsory examination by inputting the panel number and the glass number, the panel corresponding to the input number is not automatically examined any longer.

After examination of good/fail of the panel is completed as above, good/fail of the glass is examined based on the examined result of good/fail of the panel. That is to say, a plurality of panels are defined in one glass. A serial No. is assigned to each glass, and a unique number is assigned to each panel within the glass.

Examination of good/fail is performed in the order of panel numbers, and the examined results of good/fail of each panel are made in a table. The examined results are incorporated to examine good/fail of the glass. Alternatively, it is checked the number of panels having good quality within a glass, or the number of defect panels, or the number of panels having good quality that can be obtained by repair and rework, so that good/fail of the glass can be examined.

Good/fail of the glass can be examined by the above method, and the whole yield can be confirmed by incorporating the examined results of good/fail of the glass.

As aforementioned, the method for examining good/fail of a flat panel display device according to the present invention has the following advantages.

First, since good/fail of the panel is automatically examined by inputting defect contents only, the operator can improve operational efficiency. As a result, it is possible to improve quality and productivity. Furthermore, it is possible to reduce error of the examination and prevent the productivity from being reduced, as compared with a case where the operator directly examines good/fail of the panel. Since the operation contents and results of the operator are displayed, it is possible to provide convenience of the operation.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for examining good/fail of a flat panel display device, comprising the steps of:

inputting defect data for each process step:

automatically examining good/fail of the panel depending on the input defect data; and measuring good/fail and yield of a glass based on the examined result of the panel, wherein the step of inputting the defect data includes the steps of:

inputting position data of a defect;

inputting type data depending on the position data;

inputting causing process data depending on the type data of the defect;

inputting data on the degree of the defect for automatic examination;

inputting rework data for relieving the degree of the defect;

inputting estimated result data in case of rework;

inputting result data after rework; and inputting the cause if the estimated result data is different from the result data after rework.

2. The method of claim 1, wherein the step of inputting the defect data is optionally added, changed, and modified.

3. The method of claim 1, wherein the data in each step includes a plurality of detailed data to which a unique index is assigned.

4. The method of claim 3, wherein detailed data are optionally added, changed, and modified.

5. The method of claim 1, wherein the step of inputting the data in each step includes the step of inputting an index which represents corresponding detailed data.

6. The method of claim 3, wherein the detailed data in each step further includes skip data which allows a window screen to move to a next field without inputting the defect data when the input data is displayed as defect data in error, and data which is used in case of either an inevitable data or a fine defect.

7. The method of claim 1, wherein an automatic examination mode is changed to a passive examination mode if a new defect which is not included in the detailed data for each step is found in inputting the defect data.

8. The method of claim 1, wherein the detailed data depending on the position data is data on the position where a defect can occur for each process step.

9. The method of claim 8, wherein the detailed data includes gate, bus, active, pixel, passivation, and source/drain.

10. The method of claim 1, wherein the detailed data depending on the type data is data on types of a defect occurred for each detailed data of the position data.

11. The method of claim 10, wherein the types of the defect include loss, addition, foreign material pattern, particle, layer defect, discoloration, scratch, spot, and static electricity.

12. The method of claim 1, wherein the detailed data depending on the cause process data includes process steps that can cause a defect for each detailed data of the position data and the type data.

13. The method of claim 12, wherein the process steps that can cause a defect include deposition, wet etching, dry etching, washing, strip, photo, and handling.

14. The method of claim 1, wherein the detailed data depending on the type data is data on detailed defect types for each detailed data of the position data, the type data and the cause process data.

15. The method of claim 14, wherein the detailed defect types include boring, plucking, upper erosion, lower erosion, permeation of solution, sawtooth, congregation, residue, linear shape, round shape, dotted shape, foreign material type, floating, and misalignment.

16. The method of claim 1, wherein the detailed data depending on the degree of a defect includes data on the number of unit pixels where a point defect occurs, data on a line defect such as line open (LO) and line short (LS), data on spot, and skip, and data which is used in case of either an inevitable data or a fine defect.

17. The method of claim 1, wherein the detailed data depending on the data for relieving the defect includes a defect that requires repair, a defect that requires rework, a defect that requires neither repair nor rework, the distance between pixels where a point defect that requires repair occurs, the distance between pixels where a point defect that requires rework occurs, and the distance between pixels where a point defect that requires neither repair nor rework occurs.

18. The method of claim 1, wherein the detailed data depending on the estimated result of rework includes data on the number of unit pixels where a point defect occurs when rework has been performed, data on a line defect, data on spot, and skip, and data which is used in case of either an inevitable data or a fine defect.

19. The method of claim 1, wherein the step of automatically examining good/fail of the panel includes the steps of:
examining whether the defect data for each process step satisfy the data on the degree of the defect, to examine whether the panel has a defect having good quality that requires repair, and
if the panel is examined not to have a defect having good guality that requires repair, examining whether the panel has a defect having good quality that requires rework.

20. The method of claim 19, wherein the step of examining whether the current panel has a defect having good quality that requires repair includes the steps of:
detecting whether an index corresponding to repair data has been inputted, when inputting data for relieving the defect; and
finally examining that the panel has a defect having good quality that requires repair, if the index has been inputted.

21. The method of claim 19, wherein the step of examining whether the panel has a defect having good quality that requires rework includes the steps of:
detecting whether an index corresponding to rework data has been inputted when inputting data for relieving the defect, if the index corresponding to the repair data has not been inputted;
finally examining that the panel has a defect having good quality that requires rework, if the index corresponding to the rework data has been inputted; and
finally examining that the panel has a defect having good quality that does not require rework, if the index corresponding to the rework data has not been inputted.

22. The method of claim 19, wherein the repair data includes a defect that requires repair, a defect that requires rework, a defect that requires neither repair nor rework, the distance between pixels where a point defect that requires repair occurs, the distance between pixels where a point defect that requires rework occurs, and the distance between pixels where a point defect that requires neither repair nor rework occurs.

23. The method of claim 19, wherein the step of automatically examining good/fail of the panel further includes the steps of:
examining whether the defect data for each process step satisfy the estimated result data of repair if the defect data for each process step do not satisfy the data on the degree of the defect; and
finally examining whether the defect that requires repair, rework, or neither repair nor rework in accordance with the examined result.

24. The method of claim 23, wherein the step of examining whether the defect data for each process step satisfy the estimated result data of repair includes the step of finally examining whether the current panel has a defect that requires neither repair nor rework if the defect data for each process step do not satisfy the estimated result data of repair.

25. The method of claim 23, wherein the step of examining whether the defect data for each process step satisfy the estimated result data of repair includes the steps of:
detecting whether an index corresponding to the rework data has been inputted when inputting data for relieving the defect, if the defect data for each process step satisfy the estimated result data of repair;

finally examining that the panel has a defect that requires repair if the index corresponding to the rework data has been inputted;

comparing data including the rework data with the data on the degree of the defect while comparing the data including the rework data with the estimated result data of rework, so as to detect whether the compared results satisfy the estimated result data of rework;

finally examining that the panel has a defect that requires repair if the compared results satisfy the estimated result of rework; and finally examining that the panel has a defect that requires rework if the compared results do not satisfy the estimated result of rework.

26. The method of claim 1, wherein the step of examining good/fail of the glass includes the step of either making the examined results of good/fail of each panel are made in a table and records of the table are incorporated, or checking the number of panels examined as defect panels, thereby examining good/fail of the glass.

* * * * *